(12) United States Patent
Sarkar et al.

(10) Patent No.: US 9,225,682 B2
(45) Date of Patent: Dec. 29, 2015

(54) SYSTEM AND METHOD FOR A FACET SECURITY FRAMEWORK

(71) Applicant: CISCO TECHNOLOGY, INC., San Jose, CA (US)

(72) Inventors: Dipankar Sarkar, Saratoga, CA (US); Oleg Danilov, Clayton, CA (US); Alok Batra, San Jose, CA (US); John M. Morrell, Highland, MD (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 237 days.

(21) Appl. No.: 14/045,350

(22) Filed: Oct. 3, 2013

(65) Prior Publication Data
US 2015/0101034 A1    Apr. 9, 2015

(51) Int. Cl.
G06F 7/04    (2006.01)
H04L 29/06    (2006.01)
G06F 21/62    (2013.01)

(52) U.S. Cl.
CPC .............. *H04L 63/00* (2013.01); *G06F 21/62* (2013.01); *H04L 63/0815* (2013.01)

(58) Field of Classification Search
CPC .................................................. H04L 63/0815
See application file for complete search history.

(56) References Cited

U.S. PATENT DOCUMENTS 6,892,307 B1 * 5/2005 Wood et al. ...................... 726/8
2013/0067303 A1 * 3/2013 Kantor et al. ................. 715/205

OTHER PUBLICATIONS

No stated author; (S3) Amazon Simple Storage Service Developer Guide; Jun. 2013; Retrieved from the Internet <URL: web.archive.org/web/20130618073110/http://awsdocs.s3.amazonaws.com/S3/latest.s3-dg.pdf>; pp. 1-493 as printed.*
Barr, Jeff; (Barr) AWS Identity and Access Management—Now With Identity Federation; Aug. 2011; Retrieved from the Internet <URL: aws.amazon.com/blogs/aws/aws-identity-and-access-management-now-with-identity-federation/>; pp. 1-7 as printed.*
Barr, Jeff; (Barr2) Identity Federation to the AWS Console; Jan. 2012; Retrieved from the Internet <URL: aws.amazon.com/blogs/aws/category/awsiam/p./3/>; pp. 1-4 as printed.*
No stated author; (STS) AWS Security Token Service API Reference; Jun. 2013; Retrieved from the Internet <URL: web.archive.org/web/20130620083031/http://awsdocs.s3.amazonaws.com/STS/latest/sts-api.pdf>; pp. 1-27 as printed.*
No stated author; (UTSC) Using Temporary Security Credentials AWS STS; Jun. 2013; Retrieved from the Internet <URL: web.archive.org/web/20130620075538/http://awsdocs.s3.amazonaws.com/STS/latest/sts-ug.pdf>; pp. 1-47 as printed.*
Varia, Jinesh; Migrating your Existing Applications to the AWS Cloud; Oct. 2010; Retrieved from the Internet <URL: media.amazonwebservices.com/CloudMigration-main.pdf>; pp. 1-23 as printed.*
EMC Corporation, "RSA Establishes Cloud Trust Authority to Accelerate Cloud Adoption," Press Release, ©2012, 3 pages; http://www.emc.com/domains/rsa/index.htm?id=11320.
EMC Corporation, "RSA Cloud Trust Authority: To see things as they might be . . . not as they are," ©2011, 4 pages; https://blogs.rsa.com/rsa-cloud-trust-authority-to-see-things-as-they-might-be-not-as-they-are/.

* cited by examiner

*Primary Examiner* — Michael Chao
(74) *Attorney, Agent, or Firm* — Patent Capital Group (57) ABSTRACT

An example method is provided and includes intercepting an action request from an entity for an action to be performed with respect to a resource in a cloud environment, where the action request comprises a resource facet that controls access to the resource. The method also includes determining whether the resource facet is valid for the action by evaluating a policy associated with the resource; and allowing the action.

19 Claims, 10 Drawing Sheets

SYSTEM AND METHOD FOR A FACET SECURITY FRAMEWORK

TECHNICAL FIELD

This disclosure relates in general to the field of security and, more particularly, to managing a facet security framework in a network environment.

BACKGROUND

Software applications are moving towards a cloud model. The existing business models in cloud include two party systems, where there are a provider and a consumer of resources. One trend is evolving towards a multiple party scenario with application mash-ups and compositions of resources. This is referred to as a federated scenario. In a federated scenario, multiple domains can participate with multiple roles in the cloud. Existing policy based authorization systems do not work in a multi-domain federated authorization environment, as they have been designed to work in an enterprise authorization setting. The users are on-boarded from participating domains in the domain, where the resources exist. This can result in replication of subscriber databases and access controls.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes intercepting (e.g., receiving, proxying, obtaining, accepting, collecting, etc.) an action request from an entity for an action to be performed with respect to a resource in a cloud environment. The term 'entity' is meant to include any type of endpoint, node, server, provider, etc. that exists in the network, or that can initiate a communication in the network, as discussed herein. Additionally, the broad term 'facet' (inclusive of all of its permutations) encompasses any type of key, token, identifier, password, symbol, keyword, pin, code or object (potentially encrypted), token, handshake mechanism, or any other suitable element that can control or at least affect access to, management of, and/or control for a given resource.

The action request can include a resource facet that controls access to (e.g., use of, consumption of, utilization of, entry to, the ability to publish to, write to, or read) the resource. The resource can include a service, a computing resource, a memory, a processor processing time, data throughput, bandwidth, power, device usage, media, content of any kind, a virtual machine, a security tool, or any other suitable resource sought to be used. The method can also include determining whether the resource facet is valid (e.g., acceptable, verified, coincident with other data, etc.) for the action by evaluating a policy associated with the resource. The policy can include any set of rules, procedures, constructs, a framework, a model, a plan, a set of provider instructions, regulations, a plan, etc. that may be employed in such a scenario. The method also includes allowing the action (e.g., accessing the resource, publishing any object, using the resource in some manner, etc.).

In more detailed embodiments, the method may include intercepting a facet request from the entity for an initial facet, where the facet request has an authentication token, determining whether the authentication token is valid, and issuing (e.g., sending, transmitting, providing, etc.) the initial facet to the entity. In yet other embodiments, the method may include intercepting a resource facet request from the entity for the resource facet associated with the resource, where the resource facet request is associated with an initial facet; determining whether the initial facet is valid by evaluating policies associated with the initial facet; and issuing the resource facet to the entity. The policy may include a plurality of addresses and attributes (e.g., characteristics, qualities, etc.).

Example Embodiments

Figure 1:
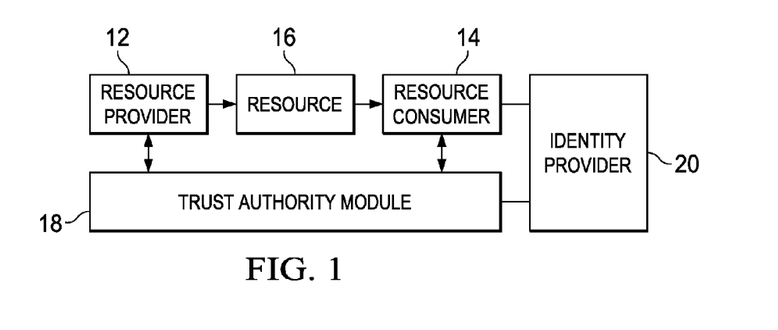
FIG. 1 is a simplified block diagram of a cloud in accordance with at least one example embodiment.

FIG. 1 is a simplified block diagram of an example cloud environment in accordance with at least one example embodiment of the present disclosure. The broad term 'cloud environment' is meant to include cloud computing, virtual computing, the 'cloud' more generally, and the like. In certain embodiments, the cloud environment includes a large number of computers connected through a real-time communication network (typically the Internet). In addition, the cloud environment can include distributed computing over a network that can include the ability to run a program on many connected computers at the same time. The cloud environment can include network-based services that appear to be provided by real server hardware, but which may actually be performed (at least in part) by one or more virtual components (e.g., simulated by software running on one or more computing machines). Such virtual components do not necessarily have a physical existence and, hence, can be readily managed, deployed, moved around, scaled up (or down), etc. without affecting end users, network operations, physical deployments, etc.

In the example of FIG. 1, the cloud environment can include a resource provider 12, a resource consumer 14, a resource 16, a trust authority module 18, and an identity provider 20. In an embodiment, resource provider 12 may be a provider of resource 16 to be offered to consumer 14. For example, resource provider 12 may be a domain, website, company enterprise system, or any other entity that may provide resource 16. In a specific example, resource consumer 14 may be any entity that obtains or uses resource 16. Resource 16 may be, for example, services, memory, processing time, data throughput, power, device usage, media, or any other type of content. In an example embodiment, trust authority module 18 may be a set of policies to govern the access to resource 16. It can act on behalf of the resource owner. Identity provider 20 may be able to authenticate resource provider 12 and resource consumer 14. Various types of routers and switches may be used to facilitate communications amongst any of the elements of FIG. 1. Also depicted in FIG. 1 are a number of pathways (e.g., shown as solid lines) between the elements for propagating any suitable data traffic.

In a specific embodiment, identity provider 20 may be configured to authenticate the identity of resource consumer 14 and/or resource provider 12. As there may be a multitude of identity providers following different standards, for example, SAML v1, v2, Liberty or Shibboleth, an identity provider module may be put in place to communicate with the different systems. The identity provider module may use a data dictionary to resolve the differences of the attributes in these systems.

In certain embodiments, the modules and elements discussed herein for offering or facilitating the facet security may be implemented in a federated architecture. A federated architecture (FA) is a pattern that describes an approach to enterprise architecture that allows interoperability and information sharing between semi-autonomous de-centrally organized lines of business (LOBs), information technology systems, and applications.

Figure 2:
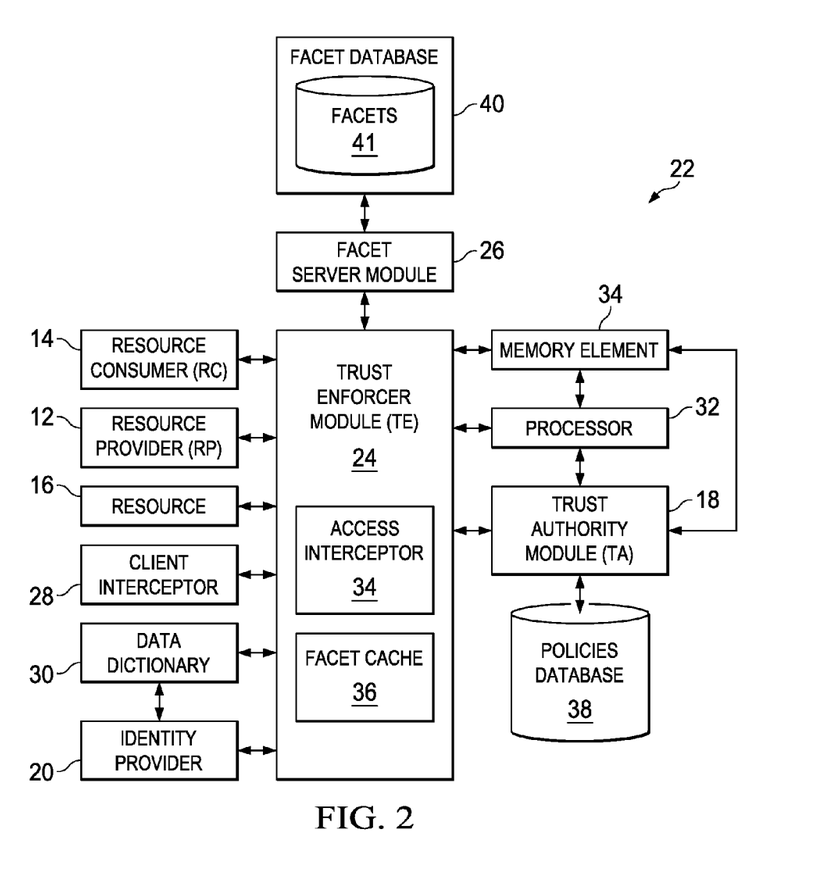
FIG. 2 is a simplified block diagram of a security framework in accordance with at least one example embodiment.

FIG. 2 is a simplified block diagram of a security framework 22 in accordance with at least one example embodiment. Security framework 22 may include a number of elements or modules. In the example of FIG. 2, security framework 22 includes resource provider 12, resource consumer 14, resource 16, trust authority module (TA) 18, a trust enforcer module (TE) 24, a facet server module 26, a client interceptor 28, and a data dictionary 30.

In an embodiment, TE 24 may be configured to restrict and allow access to resource 16 using facets. TE 24 may include access interceptor 34 and facet cache 36. Access interceptor 34 may be a module configured to intercept a request to access or publish a resource in a cloud. Facet cache 36 may be storage for all the facets pertaining to TE 24. Facets in the store may be received from facet server module 26 and held until they expire or invalidated providing for reduced remote calls to facet server module 26. TE 24 may also include client interceptor 28. Client interceptor 28 may be configured to attach facets to access a resource when, for example, an entity within security framework 22 is acting as a resource consumer as part of resource consumption.

In an embodiment, TA 18 may be a trustee of a set of resources placed under its control. TA 18 may have access policies configured for each resource. TA 18 may include policies database 38. Policies database 38 may have the different policies, rules, and regulation related to different facets and access to different resources and services.

In an embodiment, facet server module 26 may be responsible for creating, expiring, and revoking facets 41. Facets 41 may be created at the request of TA 18 and distributed to TE 24. A facet within facets 41 is an object that contains information to provide access to a resource. It can be like a bearer key that allows access to the entity that is holding the key or the facet could be endorsed to a particular subject. The subject is verified to be the requester at the point of access. A subject is an entity requesting access to a resource. It can be a combination of one or more of an identity and identity attributes (role, groups etc.). The facet may be created for a target that is identified by an address and a combination of attributes. It has a validity information which could be for a duration, a periodic timeframe like business hours on workdays or valid for a number use. If the facet has come through the delegation of authorization, the delegator information is present. The authorizations are defined using a capability object.

The broad term 'facet' (inclusive of all of its permutations) encompasses any type of key, token, identifier, password, symbol, keyword, pin, code or object (potentially encrypted), token, handshake mechanism, or any other suitable element that can control or at least affect access to, management of, and/or control for a given resource. In different embodiments, different kinds of facets may be issued. For example, this can include, but is not limited to, initial facets, initial publishing facets, resource facets, initial publishing resource facets, and other types of facets for different uses. Additionally, for example, some differently named facets may be a similar facet, but with different properties. For example, an initial facet may be similar to a resource facet, where the resource facet provides access to one or more specific resources.

Figure 3:
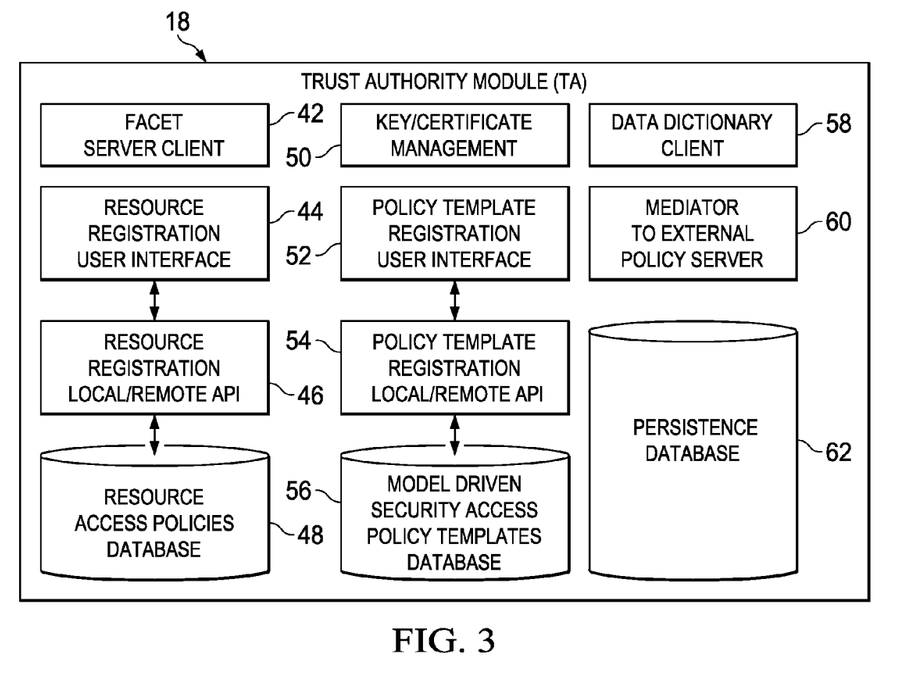
FIG. 3 is a simplified block diagram of a trust authority module (TA) in accordance with at least one example embodiment.

FIG. 3 is a simplified block diagram of a trust authority module (TA) in accordance with at least one example embodiment. TA 18 may include a number of elements or modules. In the example of FIG. 3, TA 18 includes facet server client 42, resource registration user interface 44, resource registration local/remote application programming interface (API) 46, resource access policies database 48, key/certificate management 50, policy template registration user interface 52, policy template registration local/remote API 54, model driven security access policy template database 56, data dictionary client 58, mediator to external policy server 60, and persistence database 62. In an embodiment, facet server client 42 may be a module within TA 18 that invokes the functionality of facet server module 26 as show in FIG. 2.

In a specific embodiment, resource registration user interface 44 may be available to utilize resource registration local/remote API 46 in the form of a graphical user interface. Resource registration local/remote API 46 may be the API available for resource providers to register their resource. The functionality involves all such functions required to get a resource hosted including classifying, publishing in a catalog, and/or configuring policies for issuance of facets that may govern access to a resource. Resource access policies database 48 may be, where the policies governing the access of a resource may be stored. In an embodiment, key/certificate management module 50 may be a module that may store or access storage for any private and/or public key certificates.

Persistence database 51 may be a database that is configured to store the persistence for TA 18 including any configuration and runtime data.

In an example embodiment, policy template registration local/remote API 52 may be available to utilize policy template registration local/remote API 54 in the form of a graphical user interface. Policy template registration local/remote API 54 may be the API available for policy templates. Model driven security access policy template database 56 may be provisioned where parametric policy templates are stored.

In an embodiment, data dictionary client 58 may be configured to resolve names in different taxonomies by communicating with data dictionary 30 as shown in FIG. 2. Mediator to external policy server 60 may be a module configured to communicate with external policy servers for resources that are configured to have their access policies on a remote server. For example, when a resource provider prefers the policies to reside at the resource provider. In another example, the policies may be remote when there is a proprietary policy server.

Figure 4:
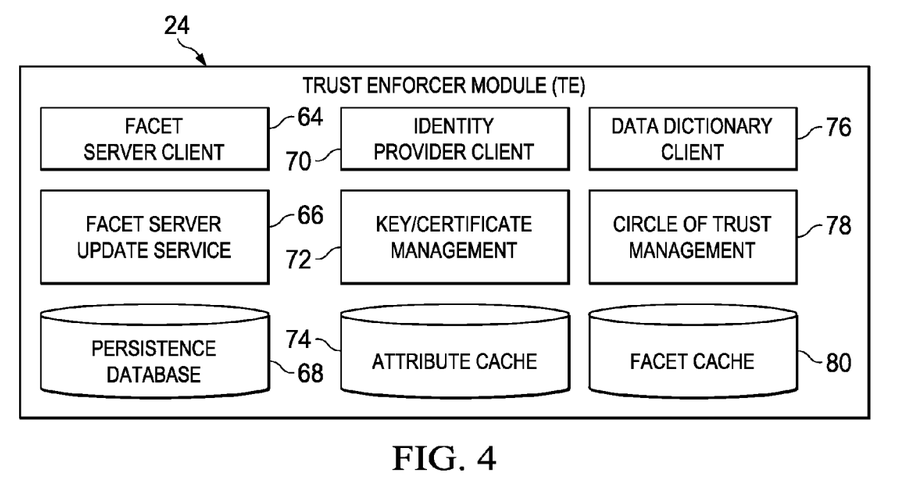
FIG. 4 is a simplified block diagram of a trust enforcer module (TE) in accordance with at least one example embodiment.

FIG. 4 is a simplified block diagram of a trust enforcer module (TE) in accordance with at least one example embodiment. TE 24 may include a number of elements or modules. In the example of FIG. 4, TE 24 includes facet server client 64, facet server update service 66, persistence database 68, identity provider client 70, key/certificate management 72, attribute cache 74, data dictionary client 76, circle of trust management 78, and facet cache 36.

In an embodiment, facet server client 64 may be a module within TE 24 that invokes the functionality of facet server module 26 as show in FIG. 2. Facet server client 64 may not be limited to a startup process and may communicate, for example, with facet server module 26 for requesting a facet for a facet URL. Facet server update service 66 may be an interface that is configured to communicate with facet server module 26 about issued and revoked facets. In a specific embodiment, persistence database 68 may be a database that is configured to store the persistence for TE 24 including any configuration and runtime data.

In an embodiment, identity provider client 70 may be configured to handle all communication to identity provider (IDP) 20 as shown in FIG. 1. Key/certificate management module 72 may be a module that may store or access storage for any private and/or public key certificates. Attribute cache 74 may be a temporary storage for attributes for identities to reduce network traffic and latencies. However, in other different embodiments, the source of validity may remain with the identity providers. Circle of trust management 78 may be a module configured to manage any identity providers and resource providers that form a circle of trust.

Figure 5:
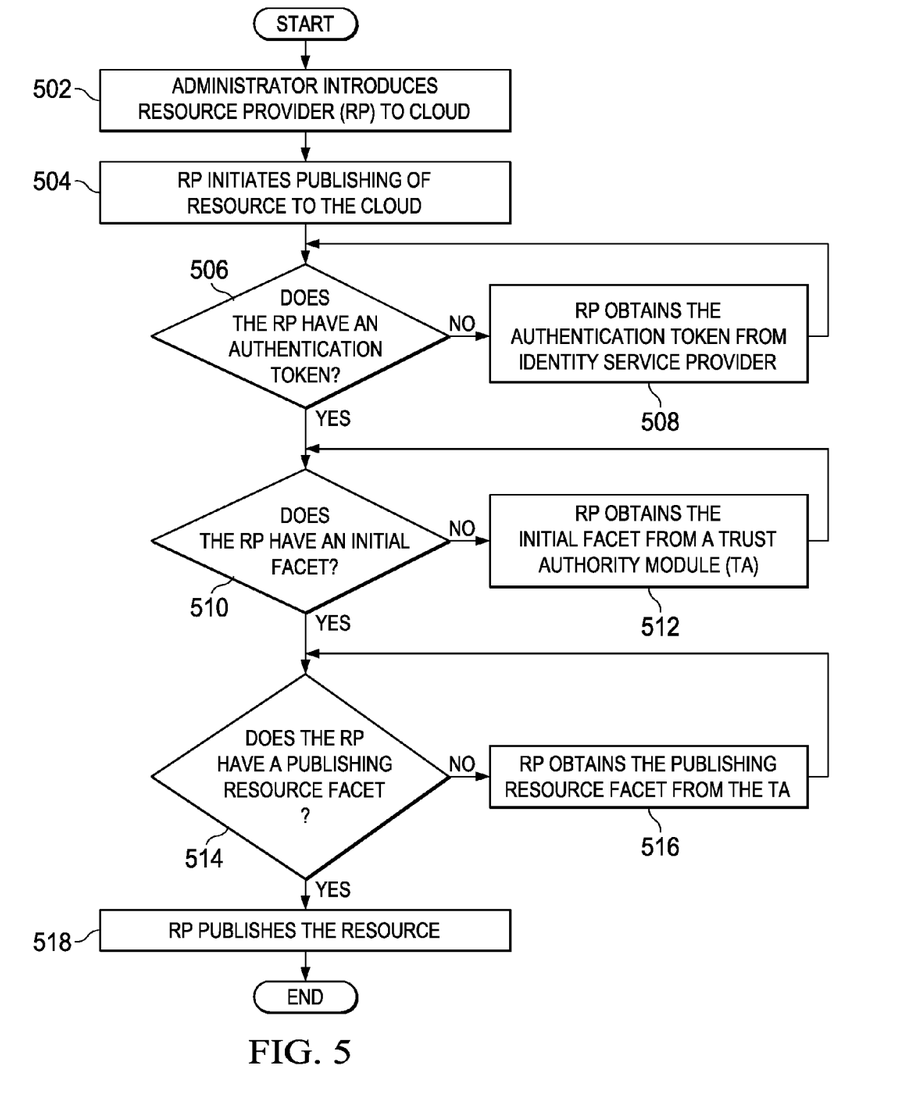
FIG. 5 is a flow diagram illustrating activities associated with managing a resource provider (RP) in a security framework in accordance with at least one example embodiment.

FIG. 5 is a flow diagram illustrating activities associated with managing a resource provider (RP) in a security framework in accordance with at least one example embodiment. In at least one example embodiment, a set of operations corresponds to the activities of FIG. 5. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 5.

At block 502, an administrator introduces a resource provider (RP) to a cloud. The cloud may be a security framework. At block 504, the RP initiates publishing of a resource to the cloud. In an embodiment, during block 502 and 504, a determination may be made to publish a resource to the cloud. The determination may be made by the RP. At block 506, the apparatus determines whether the RP has an authentication token. If the RP does not have an authentication token, then at block 508, the RP may obtain an authentication token from an identity service provider. If the RP has the authentication token, then at block 510, the apparatus determines whether the RP has an initial facet. If the RP does not have an initial facet, then at block 512, the RP may obtain the initial facet from a trust authority module.

If the RP has the initial facet, then at block 514, the apparatus determines whether the RP has a publishing resource facet. If the RP does not have a resource facet, then at block 516, the RP may obtain the resource facet from the trust authority module. If the RP has the publishing resource facet, then at block 518, the RP may publish the resource. A publishing resource facet may allow/permit for publishing a resource on a hosting service.

In operation, and in a particular embodiment, TE 24 may be responsible for protecting and allowing access to the resources as permitted by the facet in the request. If no facet or authentication token is present, it redirects the entity (RC or RP) to its Identity Provider. The entity may log into its provider by presenting its credentials. The entity receives an authentication token if the credentials are valid. The entity then presents it to the trust enforcer module. The trust enforcer module validates the authentication token with the Identity Provider and queries the subject attributes defined for the identity.

As there can be a multitude of identity providers following different standards like SAML v1, v2, Liberty or Shibboleth, a client identity provider module can be put in place to communicate with such disparate systems. The identity provider module may use the data dictionary to resolve the taxonomy difference of the attributes in these systems.

Once the identity is verified in the scenario, where the initial facet is absent, the trust enforcer module may redirect the request to the trust authority module for the resource. The trust authority module may issue the initial facet based on configured policies, which can be used to gain access. In operation, and in a particular embodiment, a facet server may be responsible for creating, expiring, and revoking facets. The facets are created at the request of trust authority module and distributed to the appropriate trust enforcer modules. The facet server can sign the facets using its digital signature. A facet verification service is made available for other entities to verify any facet and query its issue history.

In operation, and in a particular embodiment, TA 18 may be the trustee of a set of resources placed under its control. TA 18 may have access policies configured for each resource. When facets are requested for access authorizations, the trust authority module evaluates the relevant policies. If the result permits, it collects all the policies that need to be evaluated at the time of access and presents them to the facet server to create a facet. The facet server creates the facet and signs it. The facet server may update the TE protecting the resource with this facet and then hands it over to the TA. The TA hands the facet to the entity. The actual handoff is a key or facet URL that the entity has to present to gain access. Access can mean the ability to use or modify a data or execute a service as permitted in the facet.

The trust authority module, for some resources, might have to communicate with an external policy server. The remote policy server may be using a different taxonomy and even a different protocol/language. It can be configured with a plug-in that will handle the communication and return the end result. The plug-in will use the services of the data dictionary to translate to-from the different taxonomy used in the other system. The trust authority module may act upon the result of this evaluation.

Figure 6:
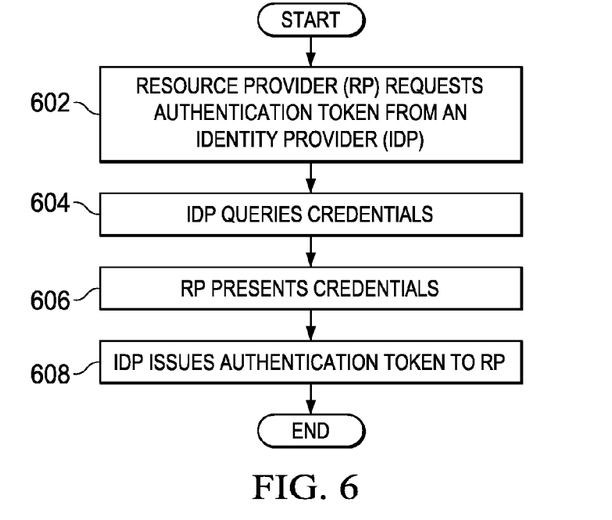
FIG. 6 is a flow diagram illustrating activities associated with obtaining an authentication token in a security framework in accordance with at least one example embodiment.

FIG. 6 is a flow diagram illustrating activities associated with obtaining an authentication token in a security framework in accordance with at least one example embodiment. In at least one example embodiment, there is a set of operations that corresponds to the activities of FIG. 6. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 6.

At block 602, an RP may request an authentication token from an identity provider (IDP). The IDP may be selected by the RP and may not need to be selected by the trust authority module (TA) of the system hosting a resource. At block 604, IDP may query credentials of the RP. At block 606, the RP may present credentials to the RP. At block 608, the IDP may issue the authentication token to the RP. Block 608 may only occur if the credentials are proper and valid. However, if they are not, then the IDP may refuse the RP.

Figure 7:
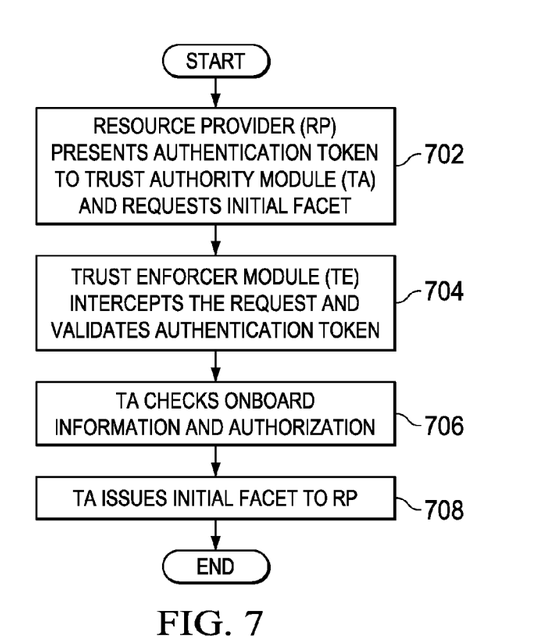
FIG. 7 is a flow diagram illustrating activities associated with obtaining an initial facet in a security framework in accordance with at least one example embodiment.

FIG. 7 is a flow diagram illustrating activities associated with obtaining an initial facet in a security framework in accordance with at least one example embodiment. In at least one example embodiment, there is a set of operations that corresponds to the activities of FIG. 7. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 7.

At block 702, an RP may present an authentication token to a trust authority module (TA) and request an initial facet. At block 704, a trust enforcer module (TE) may intercept the request and may validate the authentication token. At block 706, the TA checks onboard information and authorization. The TA may review policies regarding the RP. At block 708, the TA may issue the initial facet to the RP. The initial facet may include policy information regarding the RP.

Figure 8:
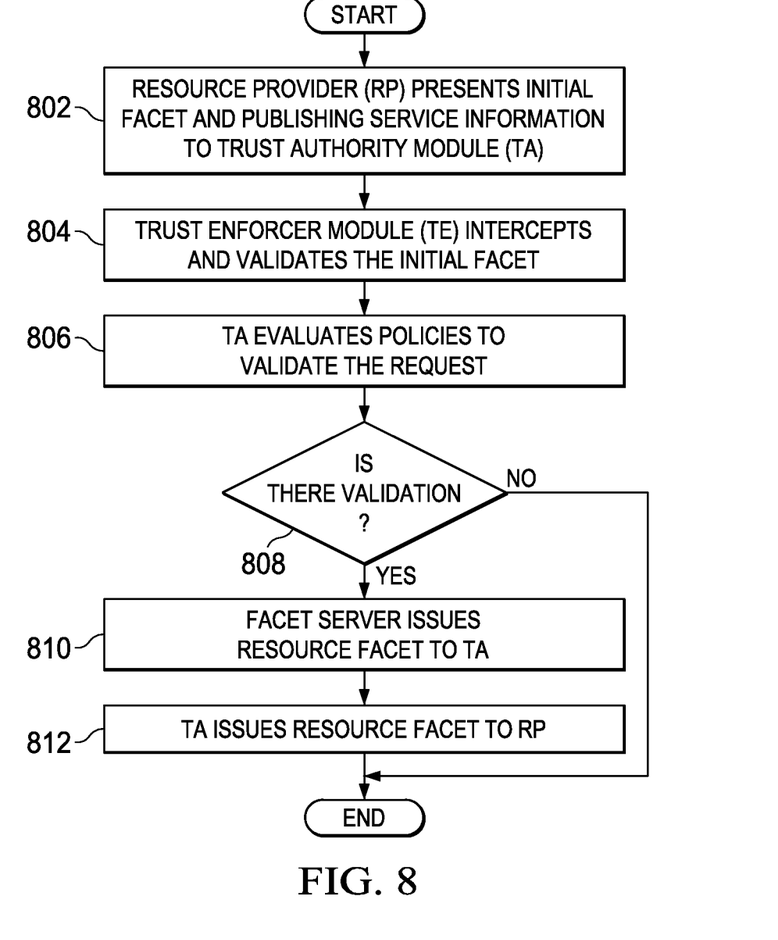
FIG. 8 is a flow diagram illustrating activities associated with obtaining a resource facet in a security framework in accordance with at least one example embodiment.

FIG. 8 is a flow diagram illustrating activities associated with obtaining a resource facet in a security framework in accordance with at least one example embodiment. In at least one example embodiment, there is a set of operations that corresponds to the activities of FIG. 8. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 8.

At block 802, an RP may present an initial facet and publishing resource information to a trust authority module (TA). The publishing resource information may be information about the resource that RP would like to publish within the domain of the TA. At block 804, a trust enforcer module (TE) may intercept the request and may validate the initial facet. The TE may validate the initial facet by checking policies and/or rules related to the initial facet. For example, there may be time requirements, or policies regarding the RP's access rights to security framework 22. At block 806, the TA evaluates polities to validate the request. The TA may validate the request by checking policies and/or rules related to the resource that the RP is requesting to publish. For example, there may be time limitations, access rights, and other types of policies related to the resource. At block 808, the TA may determine whether there is a validation. If there is not a validation, then the flow may end. If there is a validation, then at block 810, a facet server module may issue a resource facet to the TA. At block 812, the TA may issue the resource facet to the RP.

Figure 9:
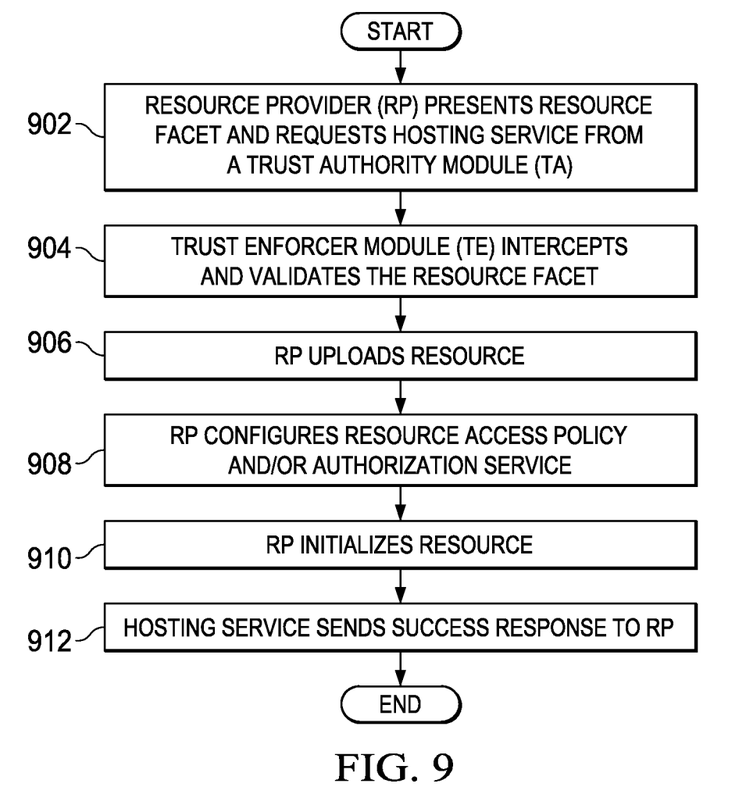
FIG. 9 is a flow diagram illustrating activities associated with publishing a resource in a security framework in accordance with at least one example embodiment.

FIG. 9 is a flow diagram illustrating activities associated with publishing a resource in a security framework in accordance with at least one example embodiment. In at least one example embodiment, there is a set of operations that corresponds to the activities of FIG. 9. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 9.

At block 902, an RP may present a resource facet and request a hosting service from a trust authority module (TA). At block 904, a trust enforcer module (TE) may intercept the request and validate the resource facet. The TE may validate the resource facet by checking policies and/or rules related to the resource facet. For example, there may be time requirements, or policies regarding the RP's access rights to the resource.

At block 906, the RP may upload the resource. At block 908, the RP may configure the resource access policy and/or authorization service. The RP may set policies and authorizations related to which resource consumers (RC) may access the resource. The RP may also set policies that are not related directly to the RC, but may be related to timing policies. At block 910, the RP may initialize the resource. Here, the RP may set the resource to be usable by a RC. For example, in an embodiment, the resource may only be available when the RP desires. At block 912, the hosting service sends a success response to the RP. The hosting service may be a service in the security framework that will host the resource.

Figure 10:
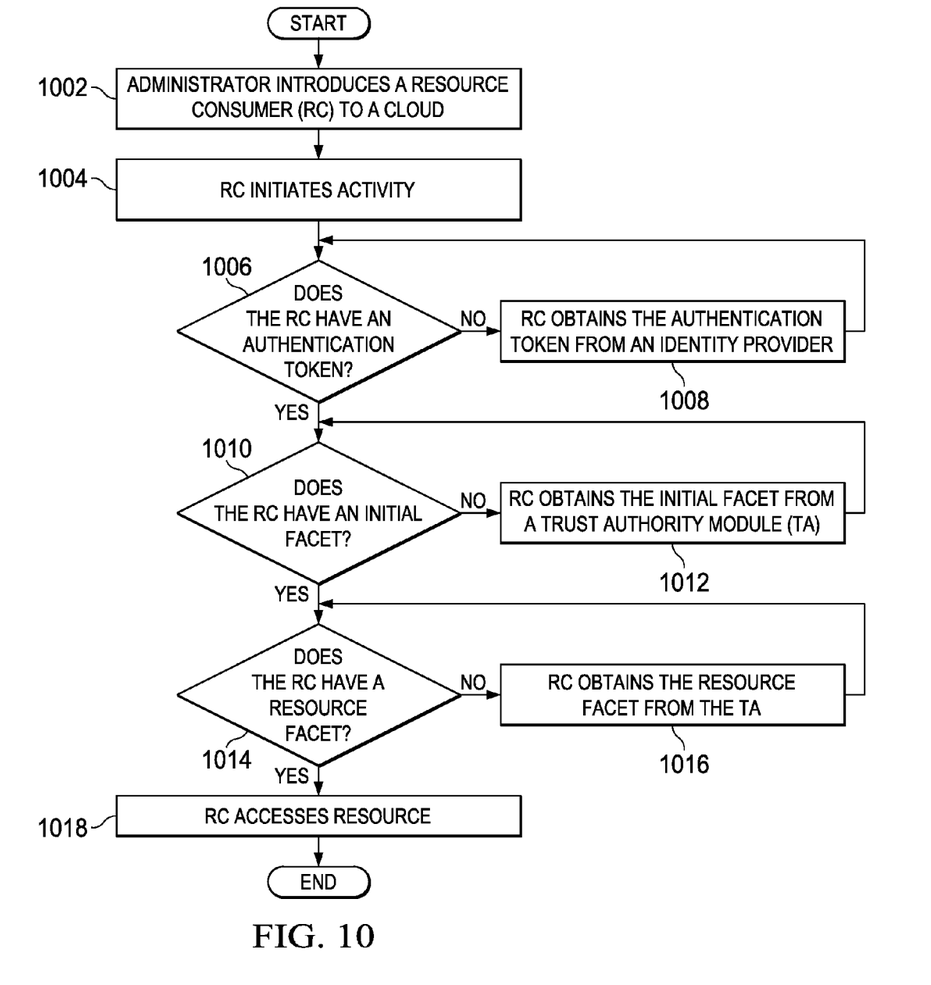
FIG. 10 is a flow diagram illustrating activities associated with managing a resource consumer (RC) in a security framework in accordance with at least one example embodiment.

FIG. 10 is a flow diagram illustrating activities associated with managing a resource consumer (RC) in a security framework in accordance with at least one example embodiment. In at least one example embodiment, there is a set of operations that corresponds to the activities of FIG. 10. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 10.

At block 1002, an administrator introduces a resource consumer (RC) to a cloud. In an example, the cloud may be a security framework. At block 1004, the RP initiates an activity. The activity may be the process of obtaining a resource or utilizing a resource. At block 1006, the apparatus determines whether the RC has an authentication token. If the RC does not have an authentication token, then at block 1008, the RC may obtain an authentication token from an identity provider.

If the RC has the authentication token, then at block 1010, the apparatus determines whether the RC has an initial facet. If the RP does not have an initial facet, then at block 1012, the RC may obtain the initial facet from a trust authority module. If the RC has the initial facet, then at block 1014, the apparatus determines whether the RC has a resource facet. If the RC does not have a resource facet, then at block 1016, the RC may obtain the resource facet from the trust authority module. If the RC has the resource facet, then at block 1018, the RC may access the resource.

Figure 11:
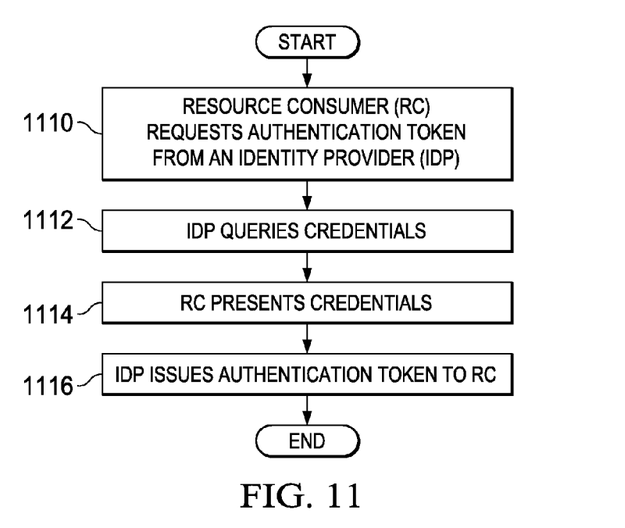
FIG. 11 is a flow diagram illustrating activities associated with obtaining an authentication token in a security framework in accordance with at least one example embodiment.

FIG. 11 is a flow diagram illustrating activities associated with obtaining an authentication token in a security framework in accordance with at least one example embodiment. In at least one example embodiment, there is a set of operations that corresponds to the activities of FIG. 11. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 11.

At block 1110, an RC may request an authentication token from an identity provider (IDP). The IDP may be selected by the RC and may not need to be selected by the trust authority module (TA) of the system hosting a resource. At block 1112, IDP may query credentials of the RC. At block 1114, the RC may present credentials to the RC. At block 1116, the IDP may issue the authentication token to the RC. Block 1116 may only occur if the credentials are proper and valid. However, if they are not, then the IDP may refuse the RC.

Figure 12:
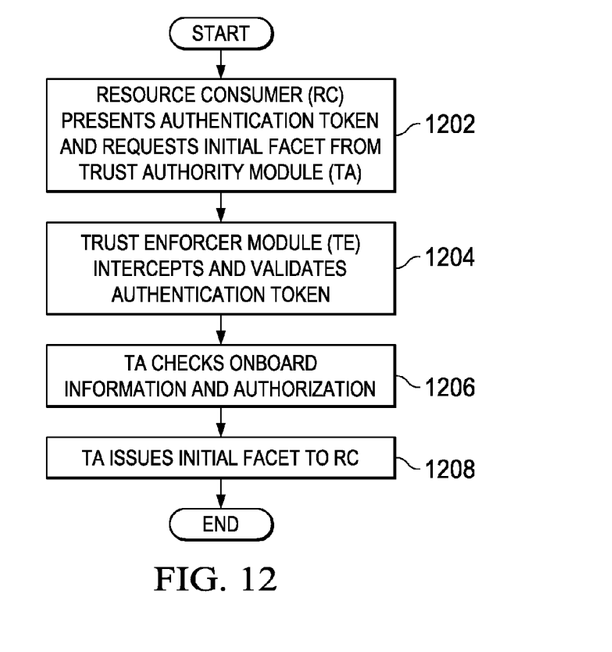
FIG. 12 is a flow diagram illustrating activities associated with obtaining an initial facet in a security framework in accordance with at least one example embodiment.

FIG. 12 is a flow diagram illustrating activities associated with obtaining an initial facet in a security framework in accordance with at least one example embodiment. In at least one example embodiment, there is a set of operations that corresponds to the activities of FIG. 12. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 12.

At block 1202, an RC may present an authentication token to a trust authority module (TA) and request an initial facet. At block 1204, a trust enforcer module (TE) may intercept the request and may validate the authentication token. At block 1206, the TA checks onboard information and authorization. The TA may review policies regarding the RP. At block 1208, the TA may issue the initial facet to the RC. The initial facet may include policy information regarding the RC.

Figure 13:
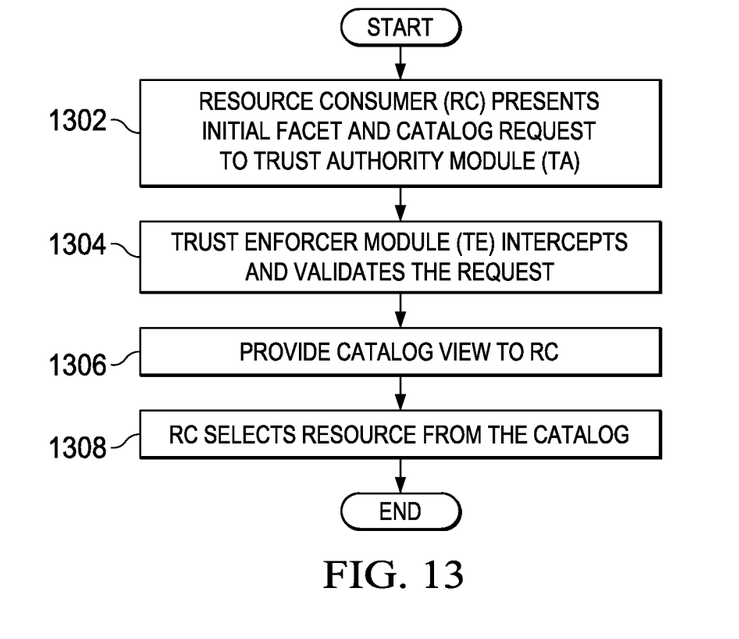
FIG. 13 is a flow diagram illustrating activities associated with selecting a resource in a security framework in accordance with at least one example embodiment.

FIG. 13 is a flow diagram illustrating activities associated with selecting a resource in a security framework in accordance with at least one example embodiment. In at least one example embodiment, there is a set of operations that corresponds to the activities of FIG. 13. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 13.

At block 1302, a RC may present an initial facet and a catalog request to a trust authority module (TA). The catalog request may be a request to view a catalog of resources within security framework 22.

At block 1304, a trust enforcer module (TE) may intercept the request and may validate the request. The TE may validate the request by checking policies and/or rules related to the request. For example, there may be time requirements, or policies regarding the RC's access rights to different resources and the resources catalog. At block 1306, the TA may provide a catalog view to the RC. The RC may be able to view the different resources available to the RC in the catalog view. At block 1308, the RC may select a resource from the catalog.

Figure 14:
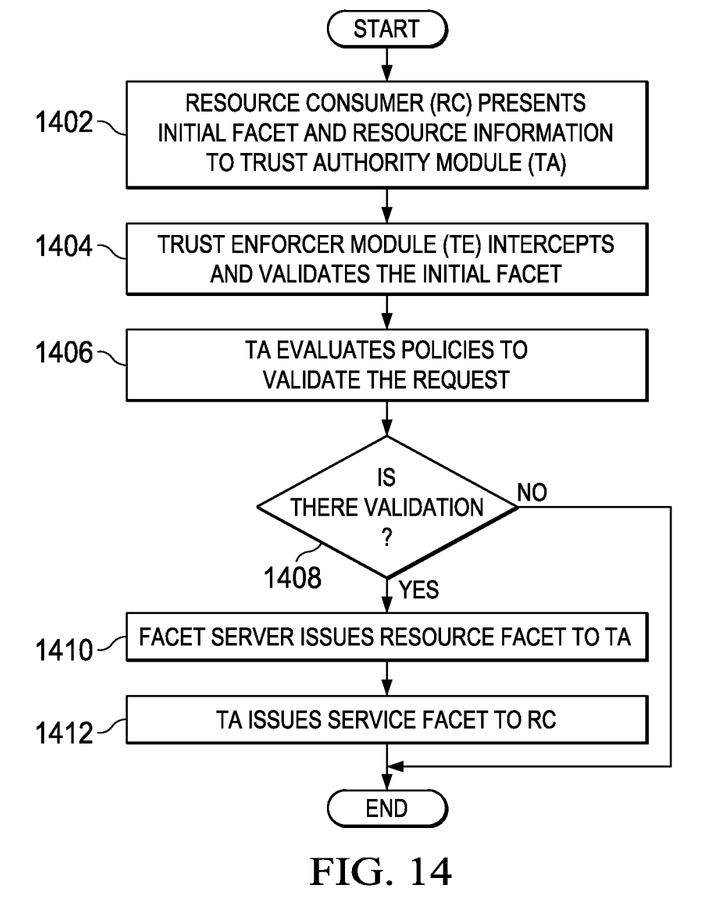
FIG. 14 is a flow diagram illustrating activities associated with obtaining a resource facet in a security framework in accordance with at least one example embodiment.

FIG. 14 is a flow diagram illustrating activities associated with obtaining a resource facet in a security framework in accordance with at least one example embodiment. In at least one example embodiment, there is a set of operations that corresponds to the activities of FIG. 14. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 14.

At block 1402, an RC may present an initial facet and resource information to a trust authority module (TA). The resource information may be information about the resource that the RC would like to access within the domain of the TA. At block 1404, a trust enforcer module (TE) may intercept the request and may validate the initial facet. The TE may validate the initial facet by checking policies and/or rules related to the initial facet. For example, there may be time requirements, or policies regarding the RC's access rights to security framework 22. At block 1406, the TA evaluates polities to validate the request. The TA may validate the request by checking policies and/or rules related to the resource that the RC is requesting to access. For example, there may be time limitations, access rights, and other types of policies related to the resource. At block 1408, the TA may determine whether there is a validation. If there is not a validation, then the flow may end. If there is a validation, then at block 1410, a facet server module may issue a resource facet to the TA. At block 1412, the TA may issue the resource facet to the RC.

Figure 15:
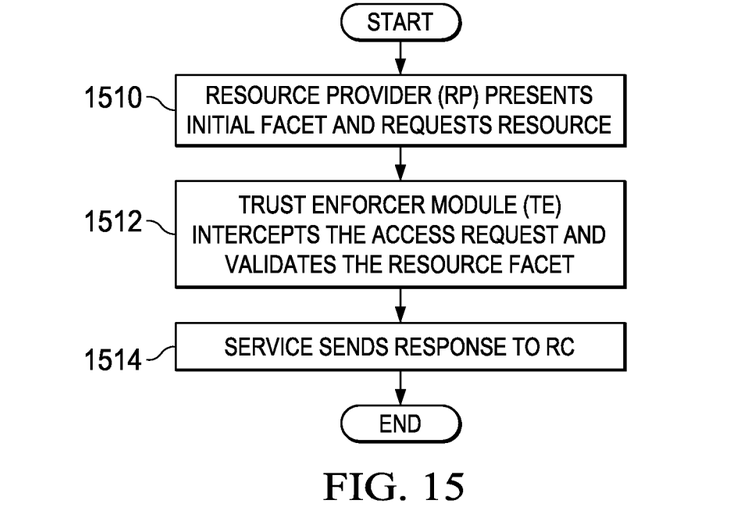
FIG. 15 is a flow diagram illustrating activities associated with accessing a resource in a security framework in accordance with at least one example embodiment.

FIG. 15 is a flow diagram illustrating activities associated with accessing a resource in a security framework in accordance with at least one example embodiment. In at least one example embodiment, there is a set of operations that corresponds to the activities of FIG. 15. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 15.

At block 1510, an RC may present a resource facet and request a resource from a trust authority module (TA). At block 1512, a trust enforcer module (TE) may intercept the access request and validate the resource facet. The TE may validate the resource facet by checking policies and/or rules related to the resource facet. For example, there may be time requirements, or policies regarding the RC's access rights to the resource. At block 1514, the hosting service may send a success response to the RC. The hosting service may be a service in the security framework that will host the resource.

In at least one example embodiment, TE 24, TA 18, facet server module 26, and/or security framework 22 more generally may include software to achieve or to support the operations as outlined herein in this document. In other embodiments, this feature may be provided externally to any of the aforementioned elements, or included in some other network element to achieve this functionality. Alternatively, several elements may include software (or reciprocating software) that may coordinate in order to achieve the operations, as outlined herein. In still other embodiments, any of the devices of the FIGURES may include any suitable algorithms, hardware, software, components, modules, interfaces, or objects that facilitate in managing a conversation.

It is imperative to note that the FIGURES are indicative of just some, of the multitude, of example implementations of TE 24, TA 18, facet server module 26, and security framework 22. For example, any of the modules or elements within security framework 22 may readily be replaced, substituted, or eliminated based on particular needs. Furthermore, although described with reference to particular scenarios, where a given module (e.g. TE 24, TA 18, facet server module 26) is provided, any one or more of these elements may be provided externally, or consolidated and/or combined in any suitable fashion. In certain instances, certain elements may be provided in a single proprietary module, device, unit, etc. in order to achieve the teachings of the present disclosure.

Referring briefly back to certain internal structure that could be used to accomplish the teachings of present disclosure, instances of RC 14 can be associated with devices, customers, or end users wishing to receive data or content in the cloud system via some network. The terms RC, endpoint, client device, subscriber, and node are interchangeable and are inclusive of any devices used to initiate a communication, such as any type of receiver, a computer, a set-top box, an Internet radio device (IRD), a cell phone, a smartphone, a laptop, a tablet, a personal digital assistant (PDA), a Google Android™, an iPhone™, an iPad™, a Microsoft Surface™, or any other device, component, element, endpoint, or object capable of initiating voice, audio, video, media, or data exchanges within a communication architecture. RC 14 may also be inclusive of a suitable interface to the human user, such as a display, a keyboard, a touchpad, a remote control, or any other terminal equipment. RC 14 may also be any device that seeks to initiate a communication on behalf of another entity or element, such as a program, a database, or any other component, device, element, or object capable of initiating an exchange within a communication system. Data, as used herein in this document, refers to any type of numeric, voice, video, media, audio, or script data, or any type of source or object code, or any other suitable information in any appropriate format that may be communicated from one point to another.

In more general terms, TE 24, TA 18, facet server module 26, and security framework 22 are network elements that can facilitate, coordinate, and/or manage the security facet activities discussed herein. As used herein in this Specification, the term 'network element' is meant to encompass any of the aforementioned elements, as well as routers, switches, cable boxes, gateways, bridges, data center elements, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, TE 24, TA 18, facet server module 26, security framework 22, and/or RC 14 include software to achieve, foster, facilitate, coordinate, and/or manage the security facet activities discussed herein. This could, for example, include the implementation of instances of specific modules, engines and/or any other suitable element that would foster the activities discussed herein. Additionally, each of these elements can have an internal structure (e.g., a processor, a memory element, etc.) to facilitate some of the operations described herein. In other embodiments, these security facet activities may be executed externally to these elements, or included in some other network element to achieve the intended functionality. Alternatively, TE 24, TA 18, facet server module 26, security framework 22, and/or RC 14 may include software (or reciprocating software) that can coordinate with other network elements in order to achieve the activities described herein. In still other embodiments, one or several devices may include any suitable algorithms, hardware, software, components, modules, interfaces, or objects that facilitate the operations thereof.

In certain example implementations, the security facet functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor [processors shown in FIG. 2], or other similar machine, etc.). In some of these instances, a memory element [memories shown in FIG. 2] can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the security facet activities, as outlined herein. Additionally, each of these devices may include a processor that can execute software or an algorithm to perform the security facet activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the communication system discussed herein (and its techniques) are readily scalable and, further, can accommodate a large number of components, as well as more complicated/sophisticated arrangements and configurations. Accordingly, the examples provided should not limit the scope or inhibit the broad techniques of the communication system discussed herein, as potentially applied to a myriad of other architectures.

It is also important to note that the steps in the preceding FIGURES illustrate only some of the possible scenarios that may be executed by, or within, the communication system discussed herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the communication system discussed herein in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for securing a federated cloud computing environment, comprising:
    intercepting, by a trust enforcer computing device from a requesting computing device, a first action request from the requesting computing device for an action to be performed with respect to a resource in the federated cloud computing environment;
    determining, by the trust enforcer computing device, that the first action request does not include a resource facet to allow access to the resource by the requesting computing device;
    in response to determining, by the trust enforcer computing device, that the first action request does not include the resource facet, redirecting the requesting computing device to an identity provider computing device;
    after redirecting the requesting computing device to the identity provider computing device, receiving, by the trust enforcer computing device from the requesting computing device, an authentication token issued to the requesting computing device by the identity provider computing device;
    upon validating the authentication token with the identity provider computing device, redirecting, by the trust enforcer computing device, the first request to a trust authority computing device, wherein the trust authority computing device is to evaluate the identity of the requesting computing device against a policy associated with the resource and to cause a facet server to issue a resource facet for the requesting computing device when the policy is satisfied:
    intercepting, by the trust enforcer computing device, a second action request from the requesting computing device for the action to be performed with respect to the resource in the federated cloud computing environment, wherein the second action request comprises the resource facet;
    determining, by the trust enforcer computing device, whether the resource facet is valid for the action; and
    in response to determining that the resource facet is valid for the action, allowing the requesting computing device to perform the action.

2. The method of claim 1, wherein the policy has a plurality of addresses and attributes, each associated with at least one resource.

3. The method of claim 2, wherein determining whether the resource facet is valid for the action comprises:
    comparing an address and attributes of the resource facet to the plurality of addresses and attributes of the policy.

4. The method of claim 1, wherein the requesting computing device is in a domain different from a domain of the resource.

5. The method of claim 1, wherein the identity provider computing device is to authenticate the requesting computing device in accordance with SAML.

6. The method of claim 1, wherein the resource facet includes delegator information indicating that access to the resource was delegated to the requesting computing device by another entity in the federated cloud computing system.

7. A trust enforcer computing device comprising at least one processor and at least one memory, the at least one memory including computer program instructions that, when executed by the at least one processor, cause the trust enforcer computing device to:
intercept, from a requesting computing device, a first action request from the requesting computing device for an action to be performed with respect to a resource in the federated cloud computing environment;
determine that the first action request does not include a resource facet to allow access to the resource by the requesting computing device;
in response to a determination that the first action request does not include the resource facet, redirect the requesting computing device to an identity provider computing device:
after redirection of the requesting computing device to the identity provider computing device, receive, from the requesting computing device, an authentication token issued to the requesting computing device by the identity provider computing device;
upon validation of the authentication token with the identity provider computing device, redirect the first request to a trust authority computing device, wherein the trust authority computing device is to evaluate the identity of the requesting computing device against a policy associated with the resource and to cause a facet server to issue a resource facet for the requesting computing device when the policy is satisfied;
intercept a second action request from the requesting computing device for the action to be performed with respect to the resource in the federated cloud environment, wherein the second action request comprises the resource facet;
determine whether the resource facet is valid for the action; and
in response to a determination that the resource facet is valid for the action, allow the requesting computing device to perform the action.

8. The trust enforcer computing device of claim 7, wherein the policy has a plurality of addresses and attributes, each associated with at least one resource.

9. The trust enforcer computing device of claim 8, wherein a determination of whether the resource facet is valid comprises a comparison of an address and attributes of the resource facet to the plurality of addresses and attributes of the policy.

10. The trust enforcer computing device of claim 7, wherein the trust authority computing device is to receive the policy associated with the resource from a resource provider computing device via an application programming interface (API).

11. The trust enforcer computing device of claim 7, wherein the resource facet is a uniform resource locator (URL).

12. The trust enforcer computing device of claim 7, wherein the trust authority computing device is to access the policy from a computing device remote from the trust authority computing device.

13. The trust enforcer computing device of claim 7, wherein the facet server is to sign the resource facet with a digital signature associated with the facet server.

14. The trust enforcer computing device of claim 7, wherein the facet server is to provide a facet verification service to provide an issue history for the resource facet.

15. A non-transitory computer readable media comprising instructions that, when executed by a processor of a trust enforcer computing device, cause the trust enforcer computing device to:
intercept, from a requesting computing device, a first action request from the requesting computing device for an action to be performed with respect to a resource in the federated cloud computing environment;
determine that the first action request does not include a resource facet to allow access to the resource by the requesting computing device;
in response to a determination that the first action request does not include the resource facet, redirect the requesting computing device to an identity provider computing device:
after redirection of the requesting computing device to the identity provider computing device, receive, from the requesting computing device, an authentication token issued to the requesting computing device by the identity provider computing device;
upon validation of the authentication token with the identity provider computing device, redirect the first request to a trust authority computing device, wherein the trust authority computing device is to evaluate the identity of the requesting computing device against a associated with the resource and to cause a facet server to issue a resource facet for the requesting computing device when the policy is satisfied;
intercept a second action request from the requesting computing device for the action to be performed with respect to the resource in the federated cloud computing environment, wherein the second action request comprises the resource facet;
determine whether the resource facet is valid for the action; and
in response to a determination that the resource fact is valid for the action, allow the requesting computing device to perform the action.

16. The media of claim 15, wherein the policy has a plurality of addresses and attributes, each associated with at least one resource.

17. The media of claim 16, wherein a determination of whether the resource facet is valid for the action comprises a comparison of an address and attributes of the resource facet to the plurality of addresses and attributes of the policy.

18. The media of claim 15, wherein the instructions are further to, upon execution by the processor, cause the trust enforcer computing device to communicate with multiple different identity provider computing devices using multiple different protocols.

19. The media of claim 18, wherein the multiple different protocols include two or more of SAML v1, SAML v2, Liberty, and Shibboleth.

* * * * *